(12) United States Patent
Niu

(10) Patent No.: US 8,764,945 B2
(45) Date of Patent: Jul. 1, 2014

(54) INDUSTRIAL CONTINUOUS CRACKING DEVICE OF RUBBER

(76) Inventor: Bin Niu, Shandong (CN)

( * ) Notice: Subject to any disclaimer, the term of this patent is extended or adjusted under 35 U.S.C. 154(b) by 752 days.

(21) Appl. No.: 12/735,315

(22) PCT Filed: Dec. 29, 2007

(86) PCT No.: PCT/CN2007/003894
§ 371 (c)(1),
(2), (4) Date: Jun. 29, 2010

(87) PCT Pub. No.: WO2009/086655
PCT Pub. Date: Jul. 16, 2009

(65) Prior Publication Data
US 2010/0282589 A1    Nov. 11, 2010

(30) Foreign Application Priority Data

Dec. 29, 2007  (CN) .......................... 2007 1 0115898

(51) Int. Cl.
*C10B 1/10*  (2006.01)

(52) U.S. Cl.
USPC .......................................... 202/136; 202/218

(58) Field of Classification Search
USPC ......... 202/105, 117, 131, 136, 137, 218, 222, 202/249; 432/114; 585/241; 201/25, 32
See application file for complete search history.

(56) References Cited

U.S. PATENT DOCUMENTS 1,587,256 A * 6/1926 Toupet et al. ................. 202/136
1,748,178 A * 2/1930 Hume ........................... 202/218

FOREIGN PATENT DOCUMENTS

CN    101074384    * 11/2007

* cited by examiner

*Primary Examiner* — Jill Warden
*Assistant Examiner* — Joye L Woodard
(74) *Attorney, Agent, or Firm* — Raymond Y. Chan; David and Raymond Patent Firm

(57) ABSTRACT

This invention is regarding an industrial continuous cracking device of rubber. The technical program of this invention is as following: including the outer cylinder and the internal cylinder, and the internal cylinder has promoting mechanism; the heating mechanism is provided in one of the outer cylinder and the internal cylinder, wherein the internal cylinder wall is fixed with heat plates. These heat plates adopt different forms, such as separated plate, intermittent or continuous helical ribbon, and so on. According to the instance of other structures of the equipment, they not only are adapted to be fixed in the internal cylinder, but also adapted to be fixed in the wall of the internal cylinder. The simple structure used in this invention has realized the effect of improving the heat efficiency, reducing the energy consumption and decreasing the running cost.

14 Claims, 1 Drawing Sheet

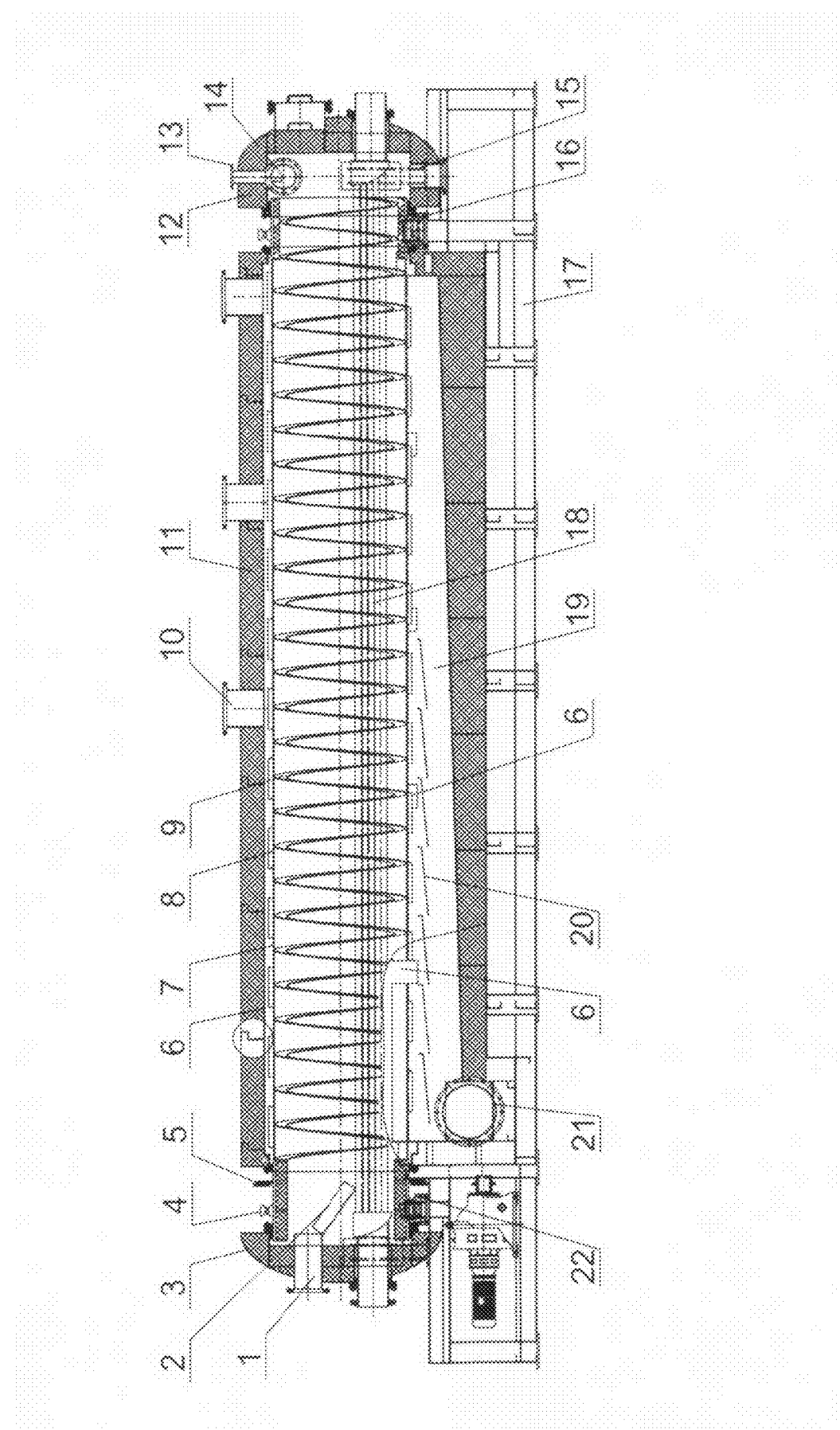

INDUSTRIAL CONTINUOUS CRACKING DEVICE OF RUBBER

BACKGROUND OF THE PRESENT INVENTION

1. Field of Invention

This invention relates to a cracking device of rubber, which can realize the continuous industrial production of rubber cracking.

2. Description of Related Arts

With the development of the technology and the improvement of the production and living standards, the output of the waste chemical materials, such as waste rubber, is growing rapidly. These waste chemical materials not only pollute the environment, but also add heavy burden to the society. So the government and many environment researchers have paid much attention to it, and they adopt all possible ways to solve these problems. The applicant of this invention has done some works on this thing by now and has successfully developed a continuous cracking process of rubber and relating equipment. In order to improve the cracking efficiency, increase the recovery rate of the oil and enhance the energy efficiency, the applicant, combining the characteristics of the current waste rubber, has been consistently engaged in higher technical level of research work and practice for many years.

SUMMARY OF THE PRESENT INVENTION

The purpose of this invention is: opening a continuous cracking device of rubber, which has a simple configuration, higher heat efficiency.

The technical program of this invention is as following: It includes the outer cylinder and the internal cylinder, and the internal cylinder has promoting mechanism inside; the heating mechanism is fixed in the outer cylinder or the internal cylinder, wherein the heat plates are fixed with internal cylinder. These heat plates can adopt many kinds of forms, such as separative plates, intermittent or continuous helical ribbon, and so on. According to the instances of other structures of the equipment, these heat plates can not only be fixed in the internal cylinder, but also can be fixed on the wall of the internal cylinder.

The structures mentioned in this invention not only can help the internal cylinder absorb more heat energy to satisfy the demand of the cracking reaction, but also can store heat energy to ensure the stabilization of the internal cylinder's cracking temperature and the continuation of the feeding heat. Thus it can be seen that the simple structures adopted in this invention, realizes the effects of improving the heat efficiency, saving energy and reducing the running cost.

In the above structures, if the heating mechanism is fixed in the internal cylinder, it can be fixed below the axis direction of the internal cylinder, that is, the heating mechanism is inclined to the reactant, because this structure is propitious to fully exerting the heating efficiency of the heating mechanism.

The concrete structures of this invention can be designed as following: the internal cylinder passes through the outer cylinder and connects with the shell cover via the movable seal; the feeding inlet, the oil-gas outlet and the ash outlet are fixed in the shell cover. In this way, the internal cylinder can be driven directly by the power mechanism, and the feeding inlet, the oil-gas outlet and the ash outlet that are connected with the cavity, can be fixed in the immovable shell cover. The method mentioned above is convenient to the equipments' connection with the outside mechanisms.

Because the heating mechanism is fixed in the below position, so the feeding inlet is generally located on the top of the heating mechanism. In order to avoid the raw materials falling directly in the heating mechanism, the feeding guide plates can be fixed on the top of the heating mechanism or below the inner end of the feeding inlet. What's more, these guide plates can adopt the form of inclining to the two sides of the heating mechanism.

In this invention, the outer cylinder's heating mechanism can use the hot-wind tube, which is fixed under the internal cylinder; the wind inlet is fixed on the bottom of the outer cylinder, and the smoke outlet is fixed on the back-end of the outer cylinder following the raw material's moving direction. By using this form, the hot-gas can heat the whole cylinder and lessen the phenomenon that the heat energy is unevenly distributed. Furthermore, the foreside of the hot-wind tube can be fixed with the air volume control board, which can regulate the inner temperature of the cylinder. This air volume control board can be made the structure of controlling the whole wind volume of the hot-wind tube, and it can also be a set of air volume control boards, which are fixed on the foreside of the hot-wind tube following the axes direction of the outer cylinder's main part. Furthermore, the foreside of every air volume control board is fixed on the hot-wind tube's sidewall through the axis. When the air volume control board is horizontally set following the cylinder's axes direction, the ventilation volume in the outer cylinder and the internal cylinder is the least, and the ventilation volume gradually becomes lagger with the gradient's increasing in the range of 90 degrees. Finally, the heat supply gradually becomes more and more.

In this invention, the pushing mechanism can be the screw or the helical ribbon fixed in the inner wall of the internal cylinder. By adopting this structure, the cracking device of rubber need not adopt the gradient structure form, which indicates this invention's characters of simple structures.

Compared with present technology, this invention has following advantages: the structure is more simple, the heat efficiency is higher, the consuming energy is much less and the running cost is much lower.

These and other objectives, features, and advantages of the present invention will become apparent from the following detailed description, the accompanying drawings, and the appended claims.

BRIEF DESCRIPTION OF THE DRAWINGS

FIG. 1 is the on-state cutaway view of the example 8 of this invention;

In the FIGURE:
1. Feeding inlet, 2. Feeding guide plate, 3. Left shell cover, 4. Idler wheel, 5. Sprocket wheel, 6. The outer cylinder, 7. The internal cylinder, 8. The heat plate, 9. The helical ribbon, 10. The smoke outlet, 11. Heat preservation layer, 12. Right shell cover, 13. The smoke outlet, 14. Oil-gas outlet, 15. The ash's outlet, 16. Supporting roller, 17. Bracket, 18. Heating tube, 19. Hot-wind tube, 20. The air volume control board, 21. The hot-wind tube's wind-inlet, 22. Supporting roller

DETAILED DESCRIPTION OF THE PREFERRED EMBODIMENT

EXAMPLE 1

This example includes the outer cylinder and the internal cylinder. The outer cylinder has the heating mechanism, and this heating mechanism can be realized by using the following method: the outer cylinder is designed as two layers structure and the heat carrier is circulating between the two layers. The internal cylinder has the feeding inlet, the ash outlet and the oil-gas outlet, and the heating plates are alternately fixed in the internal cylinder. Furthermore, the heating plate uses the different material inlaid in the wall of the internal cylinder. The screw is fixed in the internal cylinder for pushing the raw material. The rest parts of this example adopt the present technology.

EXAMPLE 2

This example includes the outer cylinder and the internal cylinder. The outer cylinder has the heating mechanism, and this heating mechanism can be the electric-heating mechanism, which is fixed in the outer cylinder. The internal cylinder has the feeding inlet, the ash outlet and the oil-gas outlet, and the heating plates are alternately fixed in the internal cylinder. Furthermore, the heating plate is set in the outer wall of the internal cylinder. The screw is fixed in the internal cylinder for pushing the raw material. The rest parts of this example adopt the present technology.

EXAMPLE 3

This example includes the outer cylinder and the internal cylinder. The outer cylinder has the heating mechanism, and this heating mechanism can be realized by using the following method: the gas inlet and the smoke outlet are fixed in the outer cylinder, and the hot wind is passed into the outer cylinder through the hot-wind inlet for heating the internal cylinder. The internal cylinder has the feeding inlet, the ash outlet and the oil-gas outlet, and the annular heating plates are alternately fixed in the internal cylinder. The helical ribbon is fixed in the internal cylinder's inner wall for pushing the raw material. The rest parts of this example adopt the present technology.

EXAMPLE 4

This example includes the outer cylinder and the internal cylinder. The outer cylinder has the heating mechanism, and this heating mechanism can be realized by using the following method: the gas inlet and the smoke outlet are fixed in the outer cylinder, and the air volume control board is also fixed in the outer cylinder. The internal cylinder has the feeding inlet, the ash outlet and the oil-gas outlet, and the spiral heating plates are alternately fixed in the internal cylinder. Furthermore, the heating plate is set in the outer wall of the internal cylinder. The helical ribbon is fixed in the internal cylinder for pushing the raw material. The rest parts of this example adopt the present technology.

EXAMPLE 5

In the example 4, the lower part of the outer cylinder is the hot-wind tube with the gas inlet, and the foreside of the hot-wind tube is fixed with a set of air volume control boards following the outer cylinder's axes direction. Furthermore, the smoke outlets are distributed at the end of the outer cylinder.

EXAMPLE 6

In the examples 3, 4 and 5, the heating mechanism is fixed in the internal cylinder, and this heating mechanism is the tube with the hot fluid (it can be gas or liquid) or the electric-heating mechanism.

EXAMPLE 7

In carrying out the example 6, the heating mechanism of the internal cylinder is inclined to the bottom of the internal cylinder, which is closing to the cracking product. By this form, the internal cylinder can be fully heated.

EXAMPLE 8

As is shown in the FIGURE, this example includes the bracket 17, inside which hot-wind tube 19 is fixed, and hot-wind tube 19 has the wind inlet 21. The outer cylinder 6 is fixed on the top of the bracket 17, the outer cylinder 6 and the hot-wind tube 19 are encircled by the heat preservation layer 11, and the outer cylinder 6's bottom space is connected with the hot-wind tube 19. A set of air volume control boards 20 are fixed in the hot-wind tube 19 following the axes direction of the outer cylinder 6, and the foreside of every air volume control board 20 are fixed on the hot-wind tube 19's sidewall through the axis. The smoke outlet 10 is fixed on the right top of the outer cylinder 6. The internal cylinder 7 is fixed on the inside of the outer cylinder 6, and the two ends of the internal cylinder 7 through the outer are fixed on the left and right shell cover by moving seal. Furthermore, the prolongation out of the outer cylinder 6 is connected with the power mechanism by the sprocket wheel 5. The continuous helical heat plate 8 is fixed on the internal cylinder's outer surface of the internal cylinder 7, which is fixed inside the outer cylinder 6. The helical ribbon 9 is fixed in the internal cylinder 7 for pushing the raw material's movement from the left part to the right part, the cracking reaction will take place in this movement from left to right. The heat carrier fluid's heat tube 18 passes through the internal cylinder 7, and the two ends of the tube are fixed on the two shell covers 3 and 12. The heat tube 18 is inclining to the bottom of the internal cylinder 7. The feeding inlet 1 is fixed on the left shell cover 3, and it is on the top of the heat tube 18. The lambdoidal feeding guide plates 2 are fixed on the feeding inlet 1's inner end and the top of the heat tube 18, and these feeding guide plates transport the raw material from the sides of the heat tube 18 to the internal cylinder 7. The right shell cover 12 of this example has the smoke outlet 13, the oil-gas outlet 14 and the ash outlet 15.

When this example is carried out, the raw material is added to the internal cylinder 7 through the feeding inlet 1, and slides into the bottom of the internal cylinder 7 following the feeding guide plate 2. With the internal cylinder's circumrotation, the raw material moves from the left to the right in the helical ribbon 9's operation. In this process, the hot wind is emitted into the outer cylinder 6 through the hot-wind tube 19 to heat the internal cylinder 7 via the outer cylinder's bottom placket, further, to heat the raw material in the heat plate 8 and the internal cylinder 7. And the heat plate will ensure the internal cylinder temperature's stabilization, while the raw material will be cracked in this process. The oil-gas produced in the cracking process is emitted through the oil-gas outlet, which is closed the right shell cover. Furthermore, the cracking product, such as carbon black, is discharged via the ash outlet. The raw material is continuously transported into the internal cylinder through the feeding inlet, while the products are continuously discharged via the oil-gas outlet and the ash outlet, thus realizes the continuous cracking of rubber.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An industrial continuous cracking device of rubber, comprising:
   an outer cylinder;
   an internal cylinder having a feeding inlet for receiving a raw material into said internal cylinder;
   a power mechanism coupled to said internal cylinder for rotating said internal cylinder within said outer cylinder; and
   a heating mechanism comprising:
   a heat tube supported within said internal cylinder at a position that said heat tube is located below a center of said internal cylinder;
   a hot-wind tube supported within said outer cylinder below of said internal cylinder; and
   a heat plate provided on an outer surface of said internal cylinder, wherein a wind inlet of said hot-wind tube is formed at a bottom of said outer cylinder for guiding a flow of hot wind into said outer cylinder to heat said heat plate, wherein said heat plate is heated up to evenly heat said internal cylinder for heating up said raw material in said internal cylinder so as to ensure said raw material to be cracked through a cracking process.

2. The industrial continuous cracking device, as recited in claim 1, wherein said heat plate is formed in spiral form and is provided at said outer surface of said internal cylinder.

3. The industrial continuous cracking device, as recited in claim 1, further comprising two shell covers, wherein said internal cylinder passes through said outer cylinder at a position that two ends of said internal cylinder are extended out of said outer cylinder, wherein said two ends of said internal cylinder are connected with said shell covers respectively, wherein two ends of said heat tube are coupled at said shell covers respectively, wherein said feeding inlet is formed at one of said shell cover, wherein a smoke outlet, an oil-gas outlet and an ash outlet are formed at another said shell cover.

4. The industrial continuous cracking device, as recited in claim 2, further comprising two shell covers, wherein said internal cylinder passes through said outer cylinder at a position that two ends of said internal cylinder are extended out of said outer cylinder, wherein said two ends of said internal cylinder are connected with said shell covers respectively, wherein two ends of said heat tube are coupled at said shell covers respectively, wherein said feeding inlet is formed at one of said shell cover, wherein a smoke outlet, an oil-gas outlet and an ash outlet are formed at another said shell cover.

5. The industrial continuous cracking device, as recited in claim 3, wherein said feeding inlet is formed on top of said heat tube of said heating mechanism, wherein a feeding guide board is inclinedly extended from said feeding inlet on top of said heat tube for feeding said raw material into said internal cylinder to a side of said heat tube.

6. The industrial continuous cracking device, as recited in claim 4, wherein said feeding inlet is formed on the top of said heat tube of said heating mechanism, wherein a feeding guide board is inclinedly extended from said feeding inlet on top of said heat tube for feeding said raw material into said internal cylinder to a side of said heat tube.

7. The industrial continuous cracking device, as recited in claim 4, wherein said ash outlet is located at an end of said outer cylinder following a raw material's moving direction, wherein said power mechanism comprises a sprocket wheel coupled at one of said ends of said internal cylinder to drive said internal cylinder to rotate.

8. The industrial continuous cracking device, as recited in claim 6, wherein said ash outlet is located at an end of said outer cylinder following a raw material's moving direction, wherein said power mechanism comprises a sprocket wheel coupled at one of said ends of said internal cylinder to drive said internal cylinder to rotate.

9. The industrial continuous cracking device, as recited in claim 1, wherein an air volume control board is provided in a foreside of said hot-wind tube of said heating mechanism.

10. The industrial continuous cracking device, as recited in claim 2, wherein an air volume control board is provided in a foreside of said hot-wind tube of said heating mechanism.

11. The industrial continuous cracking device, as recited in claim 9, wherein more than one of said air volume control boards are fixed on the foreside of said hot-wind tube following an axes direction of a main part of said outer cylinder, and a foreside of each of said air volume control boards is provided on a sidewall of said hot-wind tube through an axis.

12. The industrial continuous cracking device, as recited in claim 10, wherein more than one of said air volume control boards are fixed on the foreside of said hot-wind tube following an axes direction of a main part of said outer cylinder, and a foreside of each of said air volume control boards is provided on a sidewall of said hot-wind tube through an axis.

13. The industrial continuous cracking device, as recited in claim 1, wherein said internal cylinder further comprises a pushing mechanism which is a helical ribbon, wherein said helical ribbon is fixed in an inner wall of said internal cylinder.

14. The industrial continuous cracking device, as recited in claim 2, wherein said internal cylinder further comprises a pushing mechanism which is a helical ribbon, wherein said helical ribbon is fixed in an inner wall of said internal cylinder.

* * * * *